United States Patent
Okamoto

(10) Patent No.: US 10,671,003 B2
(45) Date of Patent: Jun. 2, 2020

(54) IMAGE FORMING APPARATUS

(71) Applicant: KYOCERA Document Solutions Inc., Osaka (JP)

(72) Inventor: Hironori Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/389,826

(22) Filed: Apr. 19, 2019

(65) Prior Publication Data
US 2019/0332047 A1    Oct. 31, 2019

(30) Foreign Application Priority Data
Apr. 26, 2018  (JP) .................. 2018-085373

(51) Int. Cl.
*G03G 15/00*   (2006.01)
*G06F 3/12*    (2006.01)
*H04N 1/00*    (2006.01)

(52) U.S. Cl.
CPC ..... *G03G 15/5004* (2013.01); *G03G 15/5016* (2013.01); *G06F 3/128* (2013.01); *G06F 3/1221* (2013.01); *G06F 3/1229* (2013.01); *G06F 3/1237* (2013.01); *H04N 1/00891* (2013.01); *H04N 1/00904* (2013.01); *Y02D 10/1592* (2018.01)

(58) Field of Classification Search
CPC ............ G03G 15/5004; G03G 15/5016; G06F 3/1221; G06F 3/1237; G06F 3/1229; G06F 3/128; H04N 1/00891; H04N 1/00904; Y02D 10/1592
See application file for complete search history.

(56) References Cited

U.S. PATENT DOCUMENTS

| | | | | |
|---|---|---|---|---|
| 2007/0285718 A1* | 12/2007 | Aoki | .................. | G03G 15/5004 358/1.16 |
| 2011/0085205 A1* | 4/2011 | Ouchi | ................... | G06F 3/1221 358/1.15 |
| 2014/0218757 A1* | 8/2014 | Konosu | .............. | G06K 15/4055 358/1.14 |
| 2018/0343355 A1* | 11/2018 | Omoya | .............. | H04N 1/00896 |

FOREIGN PATENT DOCUMENTS

JP   2008-278104 A   11/2008

* cited by examiner

*Primary Examiner* — Ryan D Walsh
(74) *Attorney, Agent, or Firm* — Studebaker & Brackett PC

(57) ABSTRACT

An image forming apparatus switches between a plurality of standby states differing in power consumption and operates accordingly. The image forming apparatus includes an interface, a specific operation section, and a controller. The interface is connectable to an external storage medium. The specific operation section performs a plurality of specific operations. The controller directs, based on a filename extension of data stored in the external storage medium, the specific operation section to operate. The standby states include a first standby state and a second standby state. The power consumption is higher in the second standby state than in the first standby state. The second standby state is a state in which the controller controls and activates the specific operation section to set the specific operation section to be ready to perform at least one of the specific operations.

4 Claims, 6 Drawing Sheets

IMAGE FORMING APPARATUS

INCORPORATION BY REFERENCE

The present application claims priority under 35 U.S.C. § 119 to Japanese Patent Application No, 2018-085373, filed on Apr. 26, 2018. The contents of this application are incorporated herein by reference in their entirety.

BACKGROUND

The present disclosure relates to an image forming apparatus.

A known image processing apparatus includes a plurality of devices. Such an image processing apparatus operates according to a specific operating mode which is preset by a user. The image processing apparatus transitions from the specific operating mode to a power saving state such as a sleep mode when no operation is performed for a prescribed period. The image processing apparatus returns from the sleep mode and activates a specific device according to the immediately preceding specific operating mode and a release trigger by an insertion operation of an external storage medium.

SUMMARY

An image forming apparatus according to an aspect of the present disclosure switches between a plurality of standby states differing in power consumption and operates accordingly. The image forming apparatus includes an interface, a specific operation section, and a controller. The interface is connectable to an external storage medium. The specific operation section performs a plurality of specific operations. The controller directs, based on a filename extension of data stored in the external storage medium, the specific operation section to operate. The standby states include a first standby state and a second standby state. The power consumption is higher in the second standby state than in the first standby state. The second standby state is a state in which the controller controls and activates the specific operation section to set the specific operation section to be ready to perform at least one of the specific operations.

DETAILED DESCRIPTION

Figure 1:
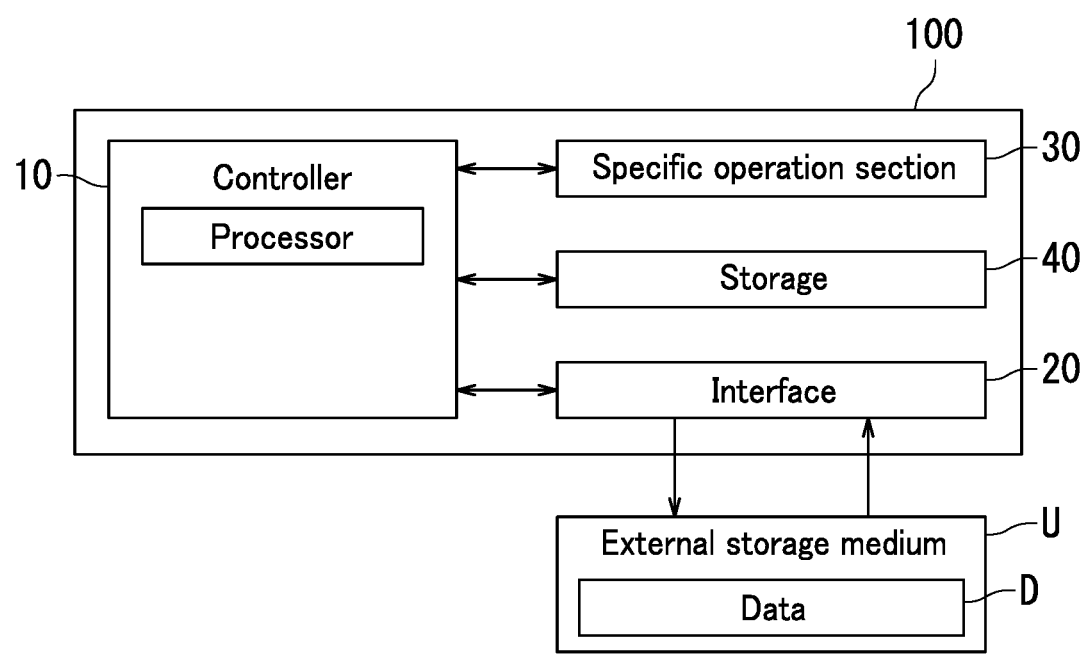
FIG. 1 is a configuration diagram illustrating an image forming apparatus according to an embodiment of the present disclosure.

The following describes an embodiment of the present disclosure with reference to the accompanying drawings. Note that elements that are the same or equivalent are labelled with the same reference signs in the drawings and description thereof is not repeated.

The following describes a configuration of an image forming apparatus 100 according to the embodiment of the present disclosure reference to FIG. 1. FIG. 1 is a configuration diagram illustrating the image forming apparatus 100. The image forming apparatus 100 is a printer, a copier, or a multifunction peripheral, for example. A multifunction peripheral includes the functions of both a copier and a printer, for example. In the following embodiment, the image forming apparatus 100 is described as a multifunction peripheral.

As illustrated in FIG. 1, the image forming apparatus 100 includes storage 40, an interface 20, a controller 10, and a specific operation section 30. The storage 40 includes a hard disk drive (HDD), random-access memory (RAM), and read-only memory (ROM), for example. The storage 40 stores therein various data, a control program, and application programs. The various data includes image data, for example. The control program is a program for controlling operation of each section of the image forming apparatus 100, and is executed by the controller 10.

The interface 20 is connectable to an external storage medium U. The interface 20 is a connection interface for external devices. The interface 20 includes a universal serial bus (USB) port and a memory card slot, for example. Upon a user attaching the external storage medium U to the interface 20, the interface 20 detects a connection operation of the external storage medium U. The interface 20 transmits, to the controller 10, a connection signal indicating a connection to the external storage medium U according to a result of detection.

The external storage medium U is attachably and detachably connected to the interface 20 according to user operation. Specifically, the external storage medium U is removable media. Examples of the external storage medium U include USB memory and a Secure Digital (SD) card. Data D can be prestored in the external storage medium U according to user operation. The data D is text data indicating text, document data indicating a document, image data indicating an image, audio data indicating audio, video data indicating video, or program data indicating a program, for example. When the external storage medium U is connected to the interface 20, the external storage medium U can be configured as a portion of the storage 40.

The interface 20 outputs a data presence signal to the controller 10. The data presence signal indicates whether or not data D is stored in the attached external storage medium U. The interface 20 also transmits, to the controller 10, a filename signal indicating a filename of the data D when data D is stored in the external storage medium U.

The controller 10 is a hardware circuit including a processor such as a central processing unit (CPU). The controller 10 controls operation of each section of the image forming apparatus 100 through the processor reading out the control program stored in the storage 40 and executing the control program. The processor also reads out an application program stored in the storage 40 and executes the application program. The controller 10 can also include a power source control module. The power source control module controls supply of electricity necessary for controlling each section.

The controller 10 directs, based on a filename extension of the data D stored in the external storage medium U, the specific operation section 30 to operate. In detail, the controller 10 receives the connection signal from the interface 20. The controller 10 analyzes the filename extension of the data D through the interface 20. For example, the controller 10 analyzes the filename extension based on the filename signal received from the interface 20. The controller 10 may also obtain the data D from the external storage medium U through the interface 20 and store the data D in the storage 40. The controller 10 transmits, to the specific operation section 30, a control signal for controlling various operations of the specific operation section 30.

The filename extension is a character string for representing an attribute and content of the data D, and indicates a file type of the data D. A filename extension for text data is ".txt" or ".html", for example. A filename extension for document data is ".doc", ".xls", ".ppt", or ".pdf", for example. A filename extension for image data is ".png", ".jpg", or ".bmp", for example. A filename extension for audio data is ".mp3" or ".wav", for example. A filename extension for video data is ".wmv" or ".mpg", for example. A filename extension for program data is ".exe" or ".sh", for example.

The specific operation section 30 performs a plurality of specific operations. Specifically, the specific operation section 30 performs the specific operations according to the control signal received from the controller 10. The specific operation section 30 and the specific operations are described later in detail with reference to FIGS. 2, 5A, and 5B.

The image forming apparatus 100 switches between a plurality of standby states differing in power consumption and operates accordingly. Specifically, the controller 10 switches the image forming apparatus 100 between the standby states by controlling the operation of each section of the image forming apparatus 100. The standby states include a first standby state and a second standby state. The first standby state is a sleep state, for example. The second standby state is a standby state in which power consumption is higher than in the first standby state. The second standby state is a state in which the controller 10 controls and activates the specific operation section 30 to set the specific operation section 30 to be ready to perform at least one of the specific operations. That is, the second standby state is a return state of the specific operation section 30. The standby states are described later in detail with reference to FIG. 2.

According to the present embodiment as described above with reference to FIG. 1, the image forming apparatus 100 switches between the standby states differing in power consumption and operates accordingly. The standby states include the first standby state and the second standby state. Power consumption is higher in the second standby state than in the first standby state. The image forming apparatus 100 includes the interface 20, the specific operation section 30, and the controller 10. The interface 20 is connectable to the external storage medium U. The specific operation section 30 performs the specific operations. The controller 10 directs, based on the filename extension of the data D stored in the external storage medium U, the specific operation section 30 to operate. The second standby state is a state in which the controller 10 controls and activates the specific operation section 30 to set the specific operation section 30 to be ready to perform at least one of the specific operations. As such, the controller 10 can switch the image forming apparatus 100 between the first standby state and the second standby state based on the filename extension of the data D. Accordingly, unnecessary power consumption can be reduced when returning from a power saving state.

Figure 2:
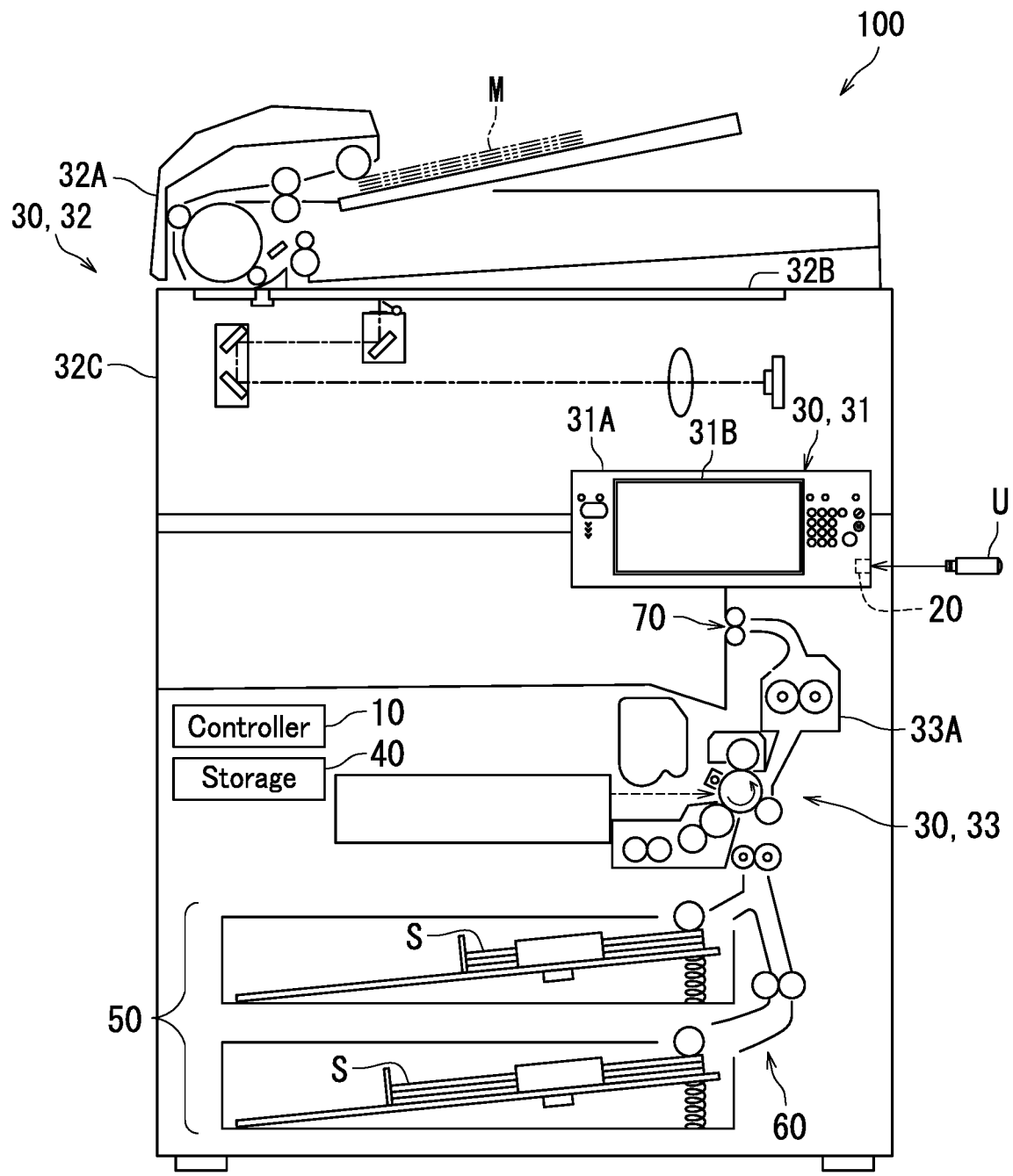
FIG. 2 is a diagram illustrating the image forming apparatus according to the embodiment of the present disclosure.

The following describes the configuration of the image forming apparatus 100, the specific operations performed by the specific operation section 30, and the standby states in detail with further reference to FIG. 2 in addition to FIG. 1. FIG. 2 is a diagram illustrating the image forming apparatus 100. As illustrated in FIG. 2, the image forming apparatus 100 further includes a feeding section 50, a conveyance section 60, and an ejection section 70 in addition to the storage 40, the interface 20, the controller 10, and the specific operation section 30 described with reference to FIG. 1. The specific operation section 30 includes an input display section 31, a reader 32, and an image forming section 33.

The input display section 31 includes an input section 31A and a display section 31B. The input display section 31 is an operation panel, for example. The interface 20 can be located on the operation panel. Various instructions are input to the input section 31A according to user operation. In detail, the input section 31A includes a touch panel function and various hardware buttons, for example. The various instructions include a reading instruction and specific operation instructions to perform the various specific operations, for example. The reading instruction is an instruction to read an image of a document M and generate image data. The specific operation instructions include a printing instruction, a reading and storage instruction, and a specific operation selection instruction. The printing instruction is an instruction to form an image on a sheet S. The reading and storage instruction is an instruction to store the image data indicating the image of the document M in the external storage medium U. The specific operation selection instruction is an instruction to select from the various specific operations. The specific operation selection instruction is later described with reference to FIG. 5A.

The display section 31B is for example a display with a touch panel function and is located on the operation panel. The display is a liquid-crystal display or an organic electroluminescent (EL) display, for example. The display section 31B such as above can simultaneously serve as the input section 31A. In detail, the display section 31B includes a screen and a touch sensor, and displays various images on the screen. The various images include software button images and various message images, for example. The message images are described later with reference to FIGS. 5A and 5B. The controller 10 can control the display section 31B so as to change a lighting state of the display.

The reader 32 includes a document conveyor device 32A, a document loading tray 32B, and a scanner 32C (optical system). The document M is loaded on a tray of the document conveyor device 32A or the document loading tray 32B. The reader 32 reads the image of the document M according to the reading instruction. The reader 32 generates image data from the read image. The specific operations include a reading and storage operation. The reading and storage operation is an operation through which the reader 32 reads the image of the document M to generate image data and stores the image data in the external storage medium U according to the reading and storage instruction.

The feeding section 50 houses a plurality of sheets S and feeds a sheet S to the conveyance section 60. The sheet S is a paper sheet or a synthetic resin sheet, for example. The conveyance section 60 includes a plurality of conveyance roller pairs and conveys the sheet S to the image forming section 33.

The specific operations include a printing operation. The printing operation is an operation through which the image forming section 33 forms an image on the sheet S based on data. In detail, the image forming section 33 includes a photosensitive drum, a charger, a light exposure device, a development device, a replenishment device, a transfer device, a cleaner, a static eliminator, and a fixing device 33A. The image forming section 33 electrographically forms an image (an image indicated by image data, for example) on the sheet S and fixes the image to the sheet S by applying heat and pressure to the image. The fixing device 33A melts unfixed toner by applying heat and pressure to the sheet S to fix the toner to the sheet S. The controller 10 can for example control the image forming section 33 so as to change the temperature of the fixing device 33A.

The conveyance section 60 conveys the sheet S with a printed image fixed thereto to the ejection section 70. The ejection section 70 ejects the sheet S out of the image forming apparatus 100.

The standby states previously described with reference to FIG. 1 specifically include a normal standby state, the first standby state, and the second standby state. The normal standby state is a state in which power consumption is at a normal value. That is, power is not being saved. The normal standby state is a ready state, for example. The ready state is a state in which any operation of the respective sections of the image forming apparatus 100 can be performed after a minimum waiting period. The minimum waiting period is a waiting period that is shorter than a waiting period in any other state such as the first or second standby states.

The first standby state is a sleep state, for example. In the first standby state, the power source control module decreases the amount of electricity supplied to each section of the image forming apparatus 100 to an amount lower than that of the normal standby state and the second standby state. The first standby state includes an unlighted state of the display section 31B, a state in which the optical system of the reader 32 is not energized, and a state in which the temperature of the image forming section 33 is decreased, for example. The unlighted state of the display section 31B is a state in which the display section 31B for example turns off a backlight of a liquid-crystal display serving as the display. The state in which the temperature of the image forming section 33 is decreased is for example a state in which the temperature of the fixing device 33A is decreased to a temperature lower than in the normal standby state and the second standby state.

The second standby state is a state in which at least one of the input display section 31, the reader 32, and the image forming section 33 is activated. That is, the second standby state is a state in which power consumption is higher than in the first standby state and lower than in the normal standby state. The user can for example input a desired operation instruction for the image forming apparatus 100 to the input section 31A in the second standby state.

The controller 10 determines whether or not the filename extension of the data D indicates printable data when the external storage medium U is connected to the interface 20 and the image forming apparatus 100 is in the first standby state. Printable data is data (may be referred to in the following as "printable data") which can be used in the printing operation by the image forming section 33 according to the attribute of the data. Printable data is text data, document data, or image data, for example. The controller 10 switches the image forming apparatus 100 from the first standby state to the second standby state when the filename extension indicates printable data. For example, the controller 10 activates either or both of the image forming section 33 and the reader 32.

By contrast, data (may be referred to in the following as "unprintable data") which cannot be used in the printing operation by the image forming section 33 according to the attribute of the data is audio data, video data, or program data, for example. The controller 10 activates the reader 32 but not the image forming section 33 when the filename extension does not indicate printable data. The controller 10 may also maintain the first standby state when the filename extension does not indicate printable data.

According to the present embodiment as described above with reference to FIGS. 1 and 2, the controller 10 can activate the image forming section 33 and the reader 32 when the filename extension of the data D indicates printable data. By contrast, the controller 10 can activate the reader 32 but not the image forming section 33 when the filename extension of the data D does not indicate printable data. As such, the controller 10 activates the image forming section 33 according to the printing instruction among the respective sections of the image forming apparatus 100 only when the filename extension indicates printable data. Accordingly, wasteful operation by the image forming section 33 which consumes much power can be inhibited.

The controller 10 can also switch the image forming apparatus 100 from the first standby state to the second standby state when the filename extension indicates printable data according to the present embodiment. By contrast, the controller 10 can maintain the first standby state when the filename extension does not indicate printable data. As such, the controller 10 activates the specific operation section 30 including the image forming section 33 when the data D is printable data, but does not activate the specific operation section 30 when the data D is unprintable data. Accordingly, activation of the specific operation section 30 not corresponding to the attribute of the data D can be prevented. As a result, unnecessary power consumption can be reduced when performing a desired operation.

Figure 3:
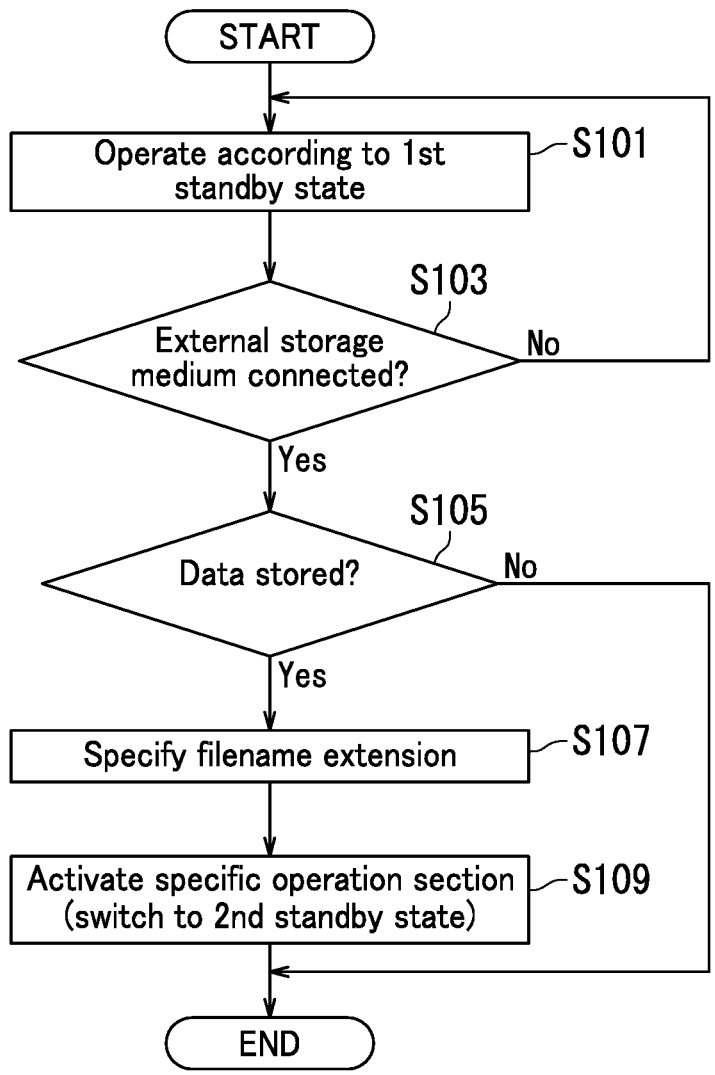
FIG. 3 is a flowchart depicting a standby state switching process.

The following describes operation of the image forming apparatus 100 with reference to FIGS. 1 to 3. FIG. 3 is a flowchart depicting a standby state switching process. The image forming apparatus 100 performs the standby state switching process based on the filename extension by performing Steps S101 to S109. The process is specifically described in the following. In Step S101, the image forming apparatus 100 operates according to the first standby state. The process advances to Step S103.

Next in Step S103, the controller 10 determines whether or not the external storage medium U is connected to the interface 20 based on the connection signal. When the external storage medium U is connected to the interface 20 (Yes in Step S103), the process advances to Step S105. When the external storage medium U is not connected to the interface 20 by contrast (No in Step S103), the process remains in Step S101 so that the controller 10 continues maintaining the first standby state.

When an affirmative determination is made (Yes) in Step S103, the controller 10 determines whether or not data D is stored in the external storage medium U in Step S105. When data D is stored in the external storage medium U (Yes in Step S105), the process advances to Step S107. When data D is not stored in the external storage medium U by contrast (No in Step S105), the process ends.

When an affirmative determination is made (Yes) in Step S105, the controller 10 identifies the filename extension of the data D in Step S107. The process advances to Step S109.

Next in Step S109, the controller 10 activates the specific operation section 30. That is, the controller 10 switches the image forming apparatus 100 from the first standby state to the second standby state. The process then ends.

Figure 4:
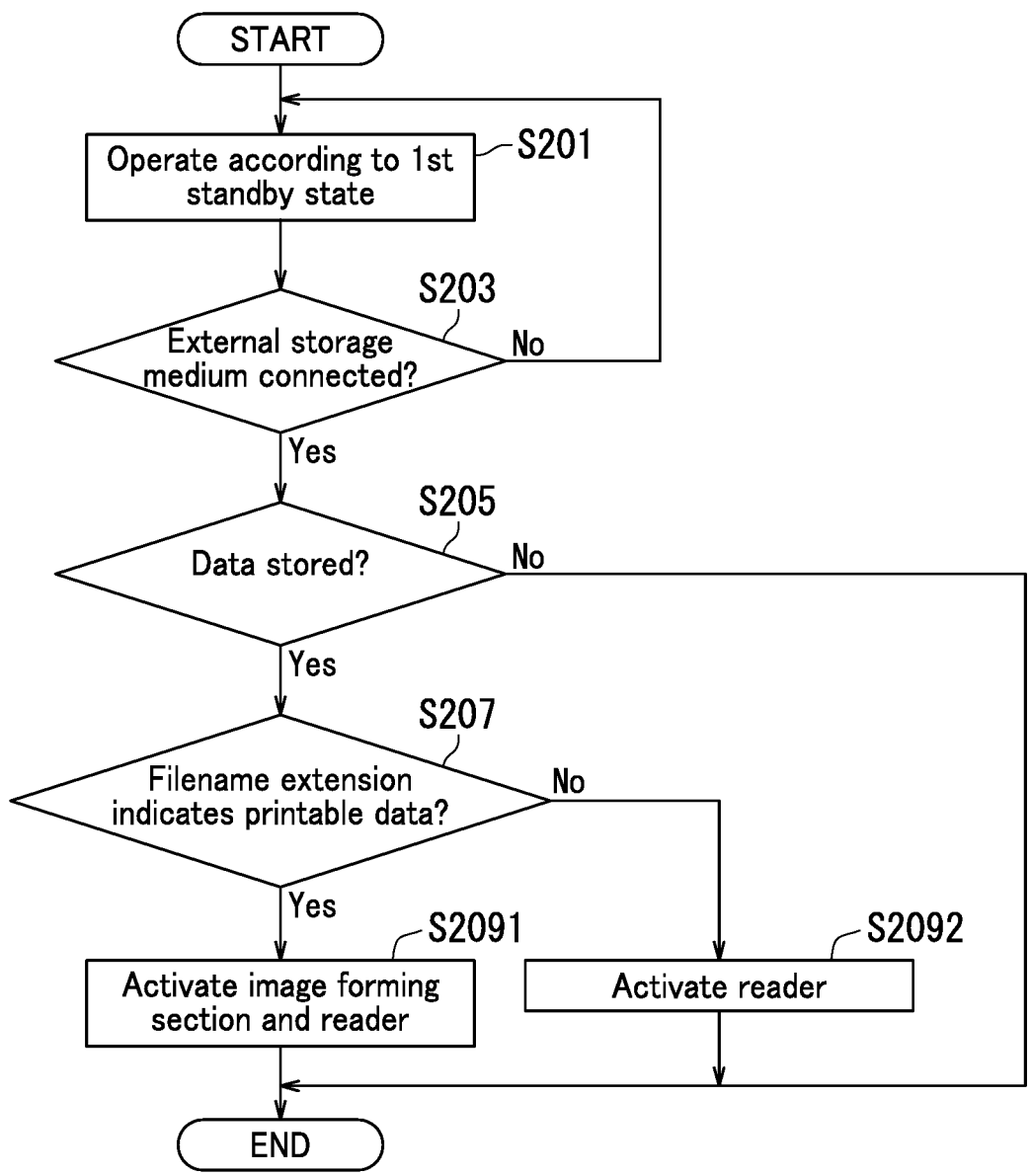
FIG. 4 is a flowchart depicting the standby state switching process.

The following describes an example of specific operation of the image forming apparatus 100 with reference to FIGS. 1 to 4. FIG. 4 is a flowchart depicting the standby state switching process. The image forming apparatus 100 performs the standby state switching process based on the filename extension by performing Steps S201 to S211. The process is specifically described in the following.

Steps S201 to S205 depicted in FIG. 4 correspond respectively to Steps S101 to S105 described with reference to FIG. 3, and the same processing is performed. When an affirmative determination is made (Yes) in Step S205, the process advances to Step S207. When a negative determination is made (No) in Step S205, the process ends.

When an affirmative determination is made (Yes) in Step S205, the controller 10 determines whether or not the filename extension of the data D is a filename extension indicating printable data in Step S207. When the filename extension indicates printable data (Yes in Step S207), the process advances to Step S2091. When the filename extension does not indicate printable data by contrast (No in Step S207), the process advances to Step S2092.

When an affirmative determination is made (Yes) in Step S207, the controller 10 activates the image forming section 33 and the reader 32 in Step S2091. The process then ends.

When a negative determination is made (No) in Step S207, the controller 10 activates the reader 32 in Step S2092. The process then ends.

Figure 5A:
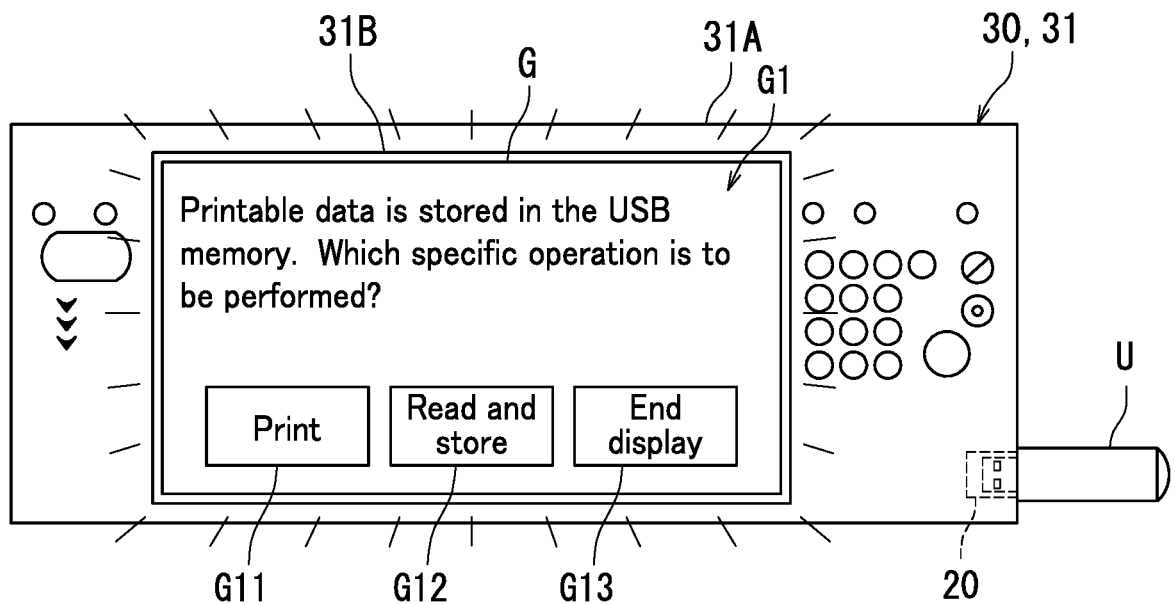
FIGS. 5A and 5B are diagrams illustrating an operation panel of the image forming apparatus and an external storage medium.
Figure 5B:
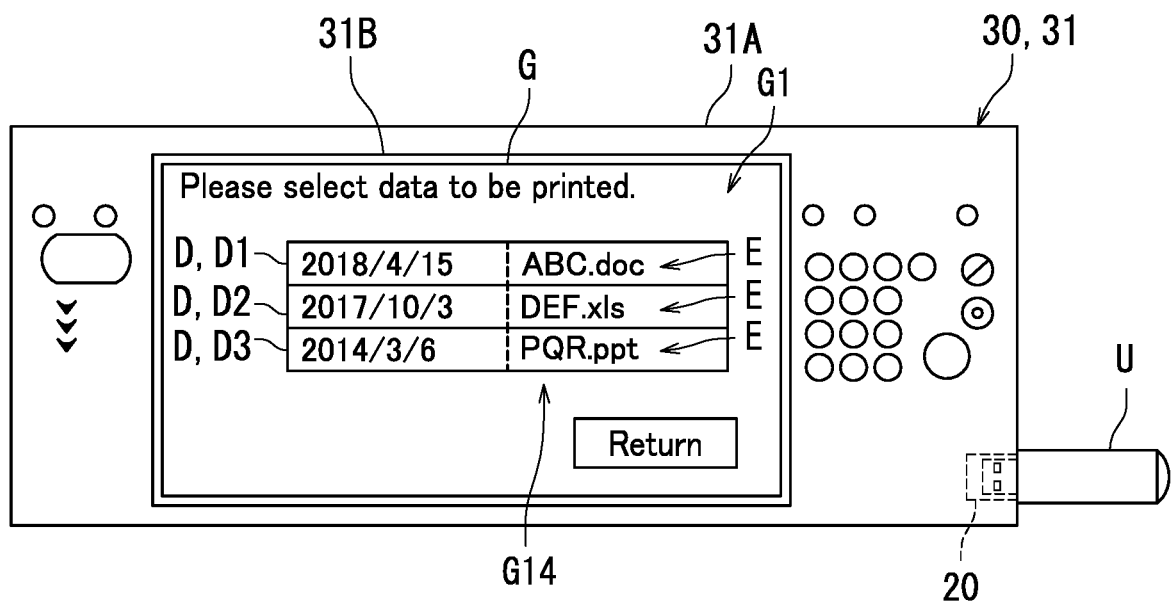

The following describes the specific operations displayed by the input display section 31 in detail with further reference to FIGS. 5A and 5B in addition to FIGS. 1 to 4. FIGS. 5A and 5B are diagrams illustrating the operation panel of the image forming apparatus 100 and the external storage medium U.

As illustrated in FIG. 5A, the specific operations can include a lighting operation. The lighting operation is an operation through which the input display section 31 is lighted. Specifically, upon the external storage medium U storing the data D being connected to the interface 20 in the first standby state, the controller 10 activates the input display section 31 when the filename extension of the data D indicates printable data. The display section 31B for example turns on the backlight of the liquid-crystal display serving as the display and displays an image G including various software button images. Through the activation of the input display section 31 in this manner, the user can input a specific operation instruction to the input section 31A through the image G. Accordingly, unnecessary power consumption can be reduced and waiting time for inputting the specific operation instruction can be shortened.

In addition, the specific operations can include a message display operation. The message display operation is an operation through which the input display section 31 displays a message image G1. The message image G1 includes a message for confirming selection of either the printing operation or the reading and storage operation.

For example, the message image G1 includes a confirmation message image and various software button images. The confirmation message image is for example a sentence such as "Printable data is stored in the USB memory. Which specific operation is to be performed?". The various software button images include for example a print button G11, a read and store button G12, and an end display button G13. According to user operation, a specific operation selection instruction to select the printing operation is input through the print button G11. A specific operation selection instruction selecting the reading and storage operation is input through the read and store button G12. An end display instruction is input through the end display button G13. The end display instruction is an instruction to end display of the image G and change the display section 31B to the unlighted state. The user can see the message image G1. As such, reliability of activating a desired section included in the specific operation section 30 can be increased through the message display operation included in the specific operations.

As illustrated in FIG. 5B, in a situation in which the data D stored in the external storage medium U includes multiple pieces of data, the input display section 31 can additionally display a list image G14 when the printing operation is performed. The list image G14 is a list indicating filenames of only printable data D.

For example, when the printable data D includes three pieces of data D1, D2, and D3, the display section 31B displays each filename of the data D1, D2, and D3 after an instruction is input through the print button G11. Each filename can include a filename extension E. The filenames of the data D1, D2, and D3 are respectively "ABC.doc", "DEF.xls", and "PQR.ppt", for example. Additionally, the display section 31B may display dates (for example, "Apr. 15, 2018", "Oct. 3, 2017", and "Mar. 6, 2014" respectively) on which the data pieces D1, D2, and D3 were stored in the external storage medium U in association with the filenames of the data pieces D1, D2, and D3. The display section 31B can display the list image G14 in chronological order and for each filename extension E. As such, the display section 31B displays the filenames of only the printable data D. Accordingly, the user can easily see the filenames of necessary data D even on a display with a small displayable area. As a result, a period before inputting a specific operation selection instruction can be shortened in a situation in which the data D stored in the external storage medium U includes multiple pieces of data.

Figure 6:
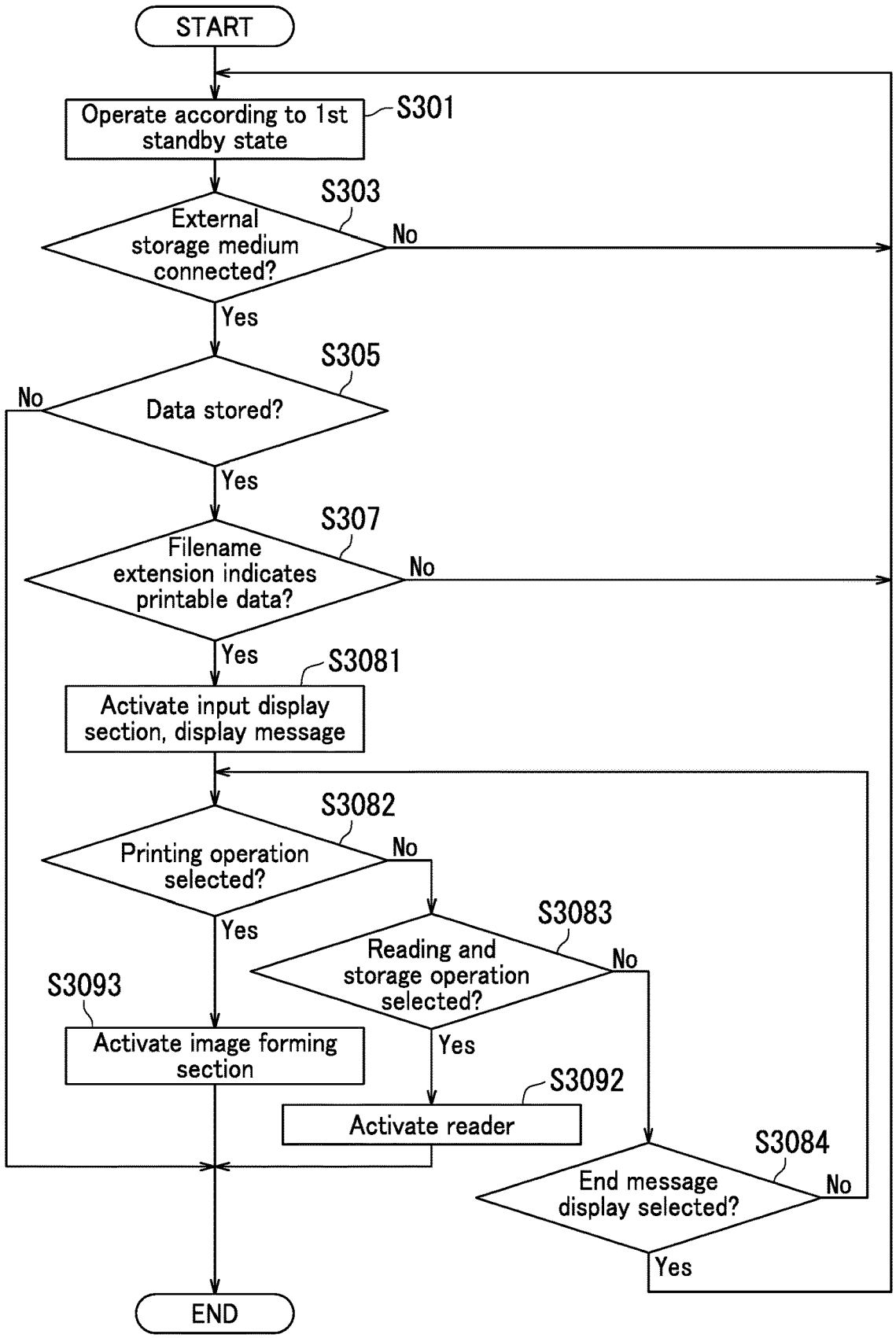
FIG. 6 is a flowchart depicting the standby state switching process.

The following describes an example of specific operation of the image forming apparatus 100 with reference to FIGS. 1 to 6. FIG. 6 is a flowchart depicting the standby state switching process. The image forming apparatus 100 performs the standby state switching process based on the filename extension E by performing Steps S301 to S3093. The process is specifically described in the following.

Steps S301 to S305 depicted in FIG. 6 correspond respectively to Steps S101 to S105 described with reference to FIG. 3, and the same processing is performed. When an affirmative determination is made (Yes) in Step S305, the process advances to Step S307. When a negative determination is made (No) in Step S305 by contrast, the process ends.

Step S307 corresponds to Step S207 described with reference to FIG. 4, and the same processing is performed when an affirmative determination is made (Yes) in Step S305. When an affirmative determination is made (Yes) in Step S307, the process advances to Step S3081. When a negative determination is made (No) in Step S307 by contrast, the process returns to Step S301 so that the controller 10 continues maintaining the first standby state.

When an affirmative determination is made (Yes) in Step S307, the controller 10 activates the input display section 31 in Step S3081. The input display section 31 performs the message display operation. The process advances to Step S3082.

Next in Step S3082, the controller 10 determines whether or not a selection instruction selecting the printing operation (printing instruction) has been input to the input section 31A. When a selection instruction selecting the printing operation has been input (Yes in Step S3082), the process advances to Step S3093. When a selection instruction selecting the printing operation has not been input (No in Step S3082) by contrast, the process advances to Step S3083.

When an affirmative determination is made (Yes) in Step S3082, the controller 10 activates the image forming section 33 in Step S3093. The process then ends.

When a negative determination is made (No) in Step S3082, the controller 10 determines whether or not a selection instruction selecting the reading and storage operation (reading and storage instruction) has been input to the input section 31A in Step S3083. When a selection instruction selecting the reading and storage operation has been input (Yes in Step S3083), the process advances to Step S3092. When a selection instruction selecting the reading and storage operation has not been input by contrast (No in Step S3083), the process advances to Step S3084.

Step S3092 corresponds to Step S2092 described with reference to FIG. 4, and the same processing is performed when an affirmative determination is made (Yes) in Step S3083. The process then ends.

When a negative determination is made (No) in Step S3083, the controller 10 determines whether or not a selection instruction to end message display (end message display instruction) has been input to the input section 31A in Step S3084. When a selection instruction to end message display has been input (Yes in Step S3084), the process returns to Step S301 so that the controller 10 switches the image forming apparatus 100 to the first standby state. When a selection instruction to end message display has not been input by contrast (No in Step S3084), the process returns to Step S3082 so that the controller 10 again determines whether or not a selection instruction selecting the printing operation has been input to the input section 31A.

The embodiment of the present disclosure is described above with reference to the drawings (FIGS. 1 to 6). However, the present disclosure is not limited to the above embodiment, and may be implemented in various embodiments within a scope not departing from the gist of the present disclosure. Furthermore, various disclosures may be created by appropriately combining elements of configuration of the embodiments. For example, some of the elements of configuration described in the embodiment may be removed. Additionally, elements of configuration in different embodiments may be appropriately combined. The drawings illustrate main elements of configuration schematically to facilitate understanding thereof. Aspects of the elements of configuration such as thickness, length, number, and spacing illustrated in the drawings may differ in practice for the sake of convenience for drawing preparation. Furthermore, aspects of the elements of configuration described in the above embodiment such as material and message content are merely examples and not specific limitations. The elements of configuration may be variously altered within a scope not substantially departing from the configuration of the present disclosure.

(1) The controller 10 described with reference to FIGS. 3, 4, and 6 ends the standby state switching process when data D is not stored in the external storage medium U. However, the present disclosure is not limited as such. The controller 10 may determine whether or not data D is stored in the external storage medium U and activate the reader 32 but not the image forming section 33 when data D is not stored in the external storage medium U. For example, the processing of Step S109 may be performed when a negative determination is made (No) in the process of Step S105 in FIG. 3. The processing of Step S2092 may be performed when a negative determination is made (No) in the process of Step S205 in FIG. 4. The processing of Step S3092 may be performed when a negative determination is made (No) in the process of Step S305 in FIG. 6. The waiting time for inputting a specific operation instruction can be shortened by the controller 10 activating the reader 32. For example, the waiting time for the user to input the reading and storage instruction can be shortened when the user wishes to store image data indicating the image of the document M in the external storage medium U in which the data D is not stored.

(2) The image forming apparatus 100 described with reference to FIGS. 2 to 6 is an electrographic multifunction peripheral. However, the present disclosure is not limited as such. The image forming apparatus 100 need only have a configuration capable of forming an image on the sheet S. The image forming apparatus 100 may be an inkjet multifunction peripheral, for example. In an embodiment in which the image forming apparatus 100 is an inkjet multifunction peripheral, the image forming section 33 can include a recording head.

What is claimed is:

1. An image forming apparatus that switches between a plurality of standby states differing in power consumption and operates accordingly, the image forming apparatus comprising:
    an interface that is connectable to an external storage medium;
    a specific operation section configured to perform a plurality of specific operations; and
    a controller configured to direct, based on a filename extension of data stored in the external storage medium, the specific operation section to operate, wherein
    the standby states include a first standby state and a second standby state, the power consumption being higher in the second standby state than in the first standby state,
    the second standby state is a state in which the controller controls and activates the specific operation section to set the specific operation section to be ready to perform at least one of the specific operations,
    the specific operation section includes an image forming section,
    the specific operations include a printing operation through which the image forming section forms an image on a sheet,
    the controller determines whether or not the filename extension of the data indicates printable data,
    the controller:
        switches the image forming apparatus from the first standby state to the second standby state when the filename extension indicates the printable data; and
        maintains the first standby state when the filename extension does not indicate the printable data,
    the specific operation section includes an input display section,
    the specific operations include a lighting operation through which the input display section is lighted,
    the controller activates the input display section when the filename extension of the data indicates the printable data,
    the specific operation section includes a reader,
    the specific operations include a reading and storage operation and a message display operation,
    the reading and storage operation is an operation through which the reader reads an image of a document to generate image data and stores the image data in the external storage medium,
    the message display operation is an operation through which the input display section displays a message image, the message image includes a message to confirm selection of either the printing operation or the reading and storage operation, and the controller:
- activates the image forming section when the printing operation is selected; and
- activates the reader when the reading and storage operation is selected.

2. The image forming apparatus according to claim 1, wherein
the controller determines whether or not data is stored in the external storage medium, and activates the reader but not the image forming section when data is not stored in the external storage medium.

3. The image forming apparatus according to claim 1, wherein
in a situation in which the data stored in the external storage medium includes multiple pieces of data, the input display section displays a list image indicating one or more filenames of only the printable data among the multiple pieces of data when the printing operation is performed.

4. The image forming apparatus according to claim 3, wherein
the list image indicates filenames of only the printable data in chronological order and for each filename extension.

\* \* \* \* \*